UNITED STATES PATENT OFFICE.

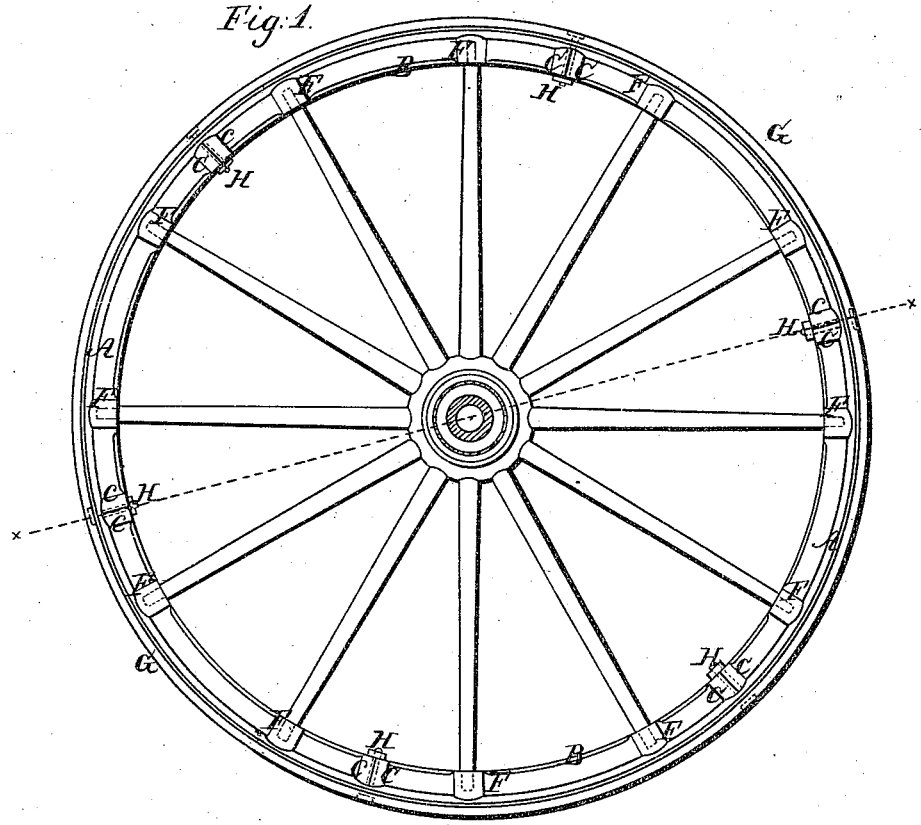

ISAAC B. WARD, OF CAMDEN, NEW JERSEY.

WHEEL FOR CARRIAGES.

Specification of Letters Patent No. 6,977, dated December 25, 1849.

*To all whom it may concern:*

Be it known that I, ISAAC B. WARD, of Camden, in the county of Camden and State of New Jersey, have invented a new and useful Improvement in the Mode of Constructing Metallic Wheels for Carriages and other Purposes, which is described as follows, reference being had to the annexed drawings of the same, making part of this specification.

Figure 1, is an elevation of the wheel. Fig. 2, is a sectional view on the line *x x* of Fig. 1—the hub and spokes being removed. Fig. 3, is a plan of the inner side of one of the fellies. Fig. 4 is a side view of the same.

Similar letters in the several figures refer to correspoding parts.

In the construction of the common carriage wheel, made with wood fellies and bound with iron tire certain evils have been experienced, which it has been my aim to remove—for instance when the fellies have been sawed and bored longitudinally in the ends to receive the connecting dowel pins and the wheel completed and used a short time it has been found that the fellies split near the ends in the direction of the boring.

Another objection to the use of wooden felly wheels arises from the liability to draw the spokes from the hub in fitting the fellies by cutting their ends to make them approximate to the form of a true circle.

There are various other objections to the use of wood fellies such as their expansion in wet weather—causing them to be indented by the shoulders of the spokes and leaving an opening or space between the shoulders of the spokes and the concave sides of the fellies when the wood again contracts in dry weather—likewise causing all the parts of the wheel to work lose and consequently to fall to pieces after being used a short time, and of the fellies to lift much mud in passing over muddy roads. All these evils are removed by my mode of constructing wheels of cast iron fellies made and arranged in a peculiar manner, which will be described hereafter.

My mode of making the fellies is as follows. I first prepare a correct pattern of the required fellies. This pattern must be a segment of the circle of the wheel and must be one sixth its circumference when the wheel is composed of six fellies—having one felly for two spokes—and in this proportion whatever may be the diameter of the wheel. The molding and casting are done in the usual manner. All the fellies are cast by the same pattern. The convex side A of the felly over which the tire G is placed must be made as wide as the required tread of the wheel and of any suitable thickness having a bead or rib B in the center of the same of any required depth and being enlarged at each end in the form of a semi-circle C or other form in which are formed semi-circular or other shaped depressions or cavities D, designed to receive the confining bolts E, that are to pass through the tire and recesses in the ends of the fellies and likewise to form an opening of the diameter of the bolt when the ends of two fellies come together. The ribbed position of the fellies is likewise enlarged at two points F, between the ends as far apart as the distance between the spokes in which enlargements, or swellings, are formed two apertures that receive the tenons of the spokes to be inserted therein.

When the required number of segments to form the wheel are cast they are finished and put together and are encircled by a circular band or tire G whose inner diameter is the same as the outer diameter of the circle of the fellies when put together. The tire is heated and put on in the same manner as in making a wheel of wood fellies. When heated it will of course expand to a greater diameter than the circle of fellies and when it cools and contracts it will embrace the fellies firmly and confine them securely. The tire is then drilled opposite the holes D formed by the coming together of the ends of the fellies on radial lines coincident with the said holes in the fellies and through which holes cylindrical or other shaped bolts E, are inserted having flat heads countersunk in the tire and spiral threads cut on the ends that pass through the cavities in the ends of the fellies on which nuts H are screwed that serve to confine the fellies firmly and securely together and prevent the possibility of the fellies moving laterally and the said bolts and nuts confine the ends from moving toward the center of the wheel. The circle of fellies being arranged in the form of a cylindrical arch prevents the possibility of the parts getting deranged when the bolts and nuts are securely fixed in their proper places. The said screw bolts and nuts also keep the tire securely in its position. They likewise do away with the usual dowel pins and allow of the requisite expansion and contraction of the segmental fellies and perform other important offices. I have represented them as round but it will be obvious to the mechanic that they may be of any required shape and size to accomplish the intended object in the most effective manner.

I do not claim to be the original and first inventor of an iron rimmed wheel, composed of cast iron segments or fellies bound together by a wrought iron band having wood spokes and hub; nor any part of the wheel heretofore used in a similar manner to that herein described in the construction of carriage wheels, but—

What I do claim as my invention and desire to have secured to me by Letters Patent, Is the manner of employing the screw bolts between the ends of the cast iron fellies of the peculiar construction herein set forth, in combination with said fellies, and the ordinary circular wrought iron tire in the formation of carriage wheels for common roads.

In testimony whereof I have hereunto signed my name before two subscribing witnesses this 3rd day of May 1849.

ISAAC B. WARD.

Witnesses:
Wm. P. Elliot,
Lund Washington, Sr.